United States Patent [19]

Hatano et al.

[11] 3,953,558

[45] Apr. 27, 1976

[54] METHOD OF MOULDING FOAMED SYNTHETIC RESIN PELLETS OF POLYOLEFINE

[75] Inventors: Itaru Hatano, Motoyamanaka; Minoru Hara, Kobe; Tsuneo Kitamura, Ashiya; Akira Ando; Yasuyuki Suganuma, both of Kobe, all of Japan

[73] Assignee: Kanegafuchi Kagaku Kogyo Kabushiki Kaisha, Osaka, Japan

[22] Filed: Dec. 18, 1973

[21] Appl. No.: 425,870

[30] Foreign Application Priority Data

Dec. 19, 1972 Japan............................ 47-128011

[52] U.S. Cl............................. 264/22; 204/159.2; 260/2.5 B; 264/50; 264/54; 264/DIG. 5; 264/DIG. 18; 428/306; 428/327

[51] Int. Cl.²...................................... B29D 27/00

[58] Field of Search............... 264/50, 54, DIG. 18, 264/321, 22, DIG. 5; 260/2.5 B; 204/159.2; 428/306, 327

[56] References Cited
UNITED STATES PATENTS

| | | |
|---|---|---|
| 2,714,747 | 8/1955 | Lindemann et al............... 264/50 |
| 2,714,748 | 8/1955 | Stirnemann et al.............. 264/50 |
| 3,054,146 | 9/1962 | Griffin............................ 264/50 |
| 3,471,610 | 10/1969 | Sadek............................. 264/321 |
| 3,812,225 | 5/1974 | Hosoda et al.................. 264/321 X |
| 3,823,213 | 7/1974 | Stastny et al................... 264/321 X |

*Primary Examiner*—Philip Anderson
*Attorney, Agent, or Firm*—Moonray Kojima

[57] ABSTRACT

A method of moulding foamed synthetic resin pellets of polyolefine in a mould, wherein the synthetic resin pellets are prepared with volumne of closed cells being more than 65 % of the total volume of the total cells and having an inorganic gas in the cells at a pressure higher than 1.18 atmospheres, then filled in a mould which is not completely gas tight, and then heated to expand and tightly adhere to each other. The pressure in the mould can be lower than ordinary pressure or at a vacuum and the pressure of the resin can be at a pressure higher than ordinary pressure. The moulded product may be removed from the mould after cooling or during cooling when the inner temperature of the product is between its melting point and a temperature 50°C below the melting point. The obtained product may be stored at a temperature of 30° to 70°C below the melting point.

18 Claims, 1 Drawing Figure

METHOD OF MOULDING FOAMED SYNTHETIC RESIN PELLETS OF POLYOLEFINE

BACKGROUND OF THE INVENTION

This invention relates to a method of moulding foamed porous pellets of synthetic resin of polyolefine.

Foamed polyolefines, such as polyethylene, are widely used in various applications; for example, as thermal insulators, cushions, packing materials, floating materials, sundry goods, building materials, etc. In these prior applications, the product is usually in the shape of plates, sheets, or films.

If other specially shaped products were desired, they were usually prepared from the plates, sheets or films, such as by cutting or scraping, and if necessary, adhering them to each other. But, such prior methods are tedious, and impractical to practice on an industrial scale and have much to be desired. In extreme cases, such methods are impossible to perform.

It is thus highly desirable to produce a moulded product of any finger or shape directly from the preliminary foamed resin pellets disposed in a mould. However, a method for production of a low density porous product with a desired complicated shape directly from foamable resin particles of polyolefines in a moulding process is not yet known due, it is thought, mainly to the technical difficulties involved.

SUMMARY OF THE INVENTION

The foregoing and other problems and disadvantages of the prior art are overcome by the present invention which encompasses a method wherein foamed synthetic resin pellets of polyolefine are first prepared to have numerous closed cells whose total volume is more than 65% of the total volume of the total cells and to have inorganic gas in the cells at a pressure higher than 1.18 atmospheres. Then, these resin pellets so prepared are placed in to fill a mould which can enclose the pellets therein with sufficient opening to permit gas to escape therefrom, and then heated to cause expansion and pushing of the cells against each other and their adherence to each other in a tight manner and to accurately and precisely fit the mould. The moulded product may be removed from the mould after cooling or during cooling while the inner temperature of the product is between its melting point and a temperature which is 50°C below melting point.

Thus, the invention provides a method of moulding foamed synthetic resin pellets of polyolefines in a mould so as to fit same closely without any deformation, at a relatively low temperature, and employing a short work cycle, thereby to produce a final foamed product of any desired shape regardless of its complexity.

Advantageously, when the prepared pellets are placed in the moulds, the moulds may be retained at a reduced pressure lower than ordinary pressure (i.e., atmospheric pressure) or at a vacuum and the pellets at the pressure higher than ordinary pressure. The pellets may be prepared from cross-linked polyolefines having 0.01 to 70 percent gel content. Also, after removal, the final product may be stored in a room or a vessel at an aging temperature of from 30° to 70°C lower than its melting point.

Moreover, an added feature is an apparatus for performing the foregoing invention, comprising a moulding machine provided with an inner closed space of a desired shape to take the preliminarily foamed resin pellets, a heating device, a cooling time regulator, and a pressure proof vessel to expose the resin pellets to a high pressure inorganic gas, and a device for removing the moulded product at an appropriate temperature.

DETAILED DESCRIPTION OF PREFERRED EMBODIMENTS

Foamed resin pellets of polyolefine (which term will be defined hereinafter) used in the invention are those which have a plurality of closed cells whose total volumne is more than 65% of the total volumne of the total cells contained in the pellets. The percentage is observed with an pyeometer of the type that compares air volumes, as will be explained hereinafter in greater detail. The larger the percentage of volume of closed cells to volumne of total cells, the better the results. To obtain such foamed pellets having the percentage of 65% or more, cross linked synthetic resinpellets of polyolefines may be used.

Generally, as polymers of olefine series have a great tendency to crystalize easily and therefore have rather a sharp melting point, their viscosity abruptly changes at the melting point as a border line; that is, the polymer scarecely flows at a temperature lower than the melting point and easily flows at a temperature above the melting point. This produces many difficulties in preparation of foamed resin pellets from polyolefine series resin pellets containing a foaming agent by heating them above the melting point since it is highly difficult to adjust the relation between the fluidity of the resin and the generation of gas from the foaming agent by the choice of working temperature just fit to that purpose. Thus, cross-linking structure may be introduced into the molecular structure of the resin to broaden the acceptable working region, generally. Although the optimum degree of cross-linking depends upon method of production of foamed, moulded product itself, the foaming agent and resin used as a starting material, etc., a range of 0.01 to 70% of gel content of the cross-linked polyolefine, covers the purpose of the present invention. Suitable conditions are chosen within the range depending upon the kind of resin to be used, the kind of product desired. etc. The gel content is the observed amount of an insoluble part of resin extracted for 48 hours with boiling xylene, in terms of weight percent.

Method of obtaining cross-linking in the resin of polyolefine may include irradiation of ionizable radiation or use of organic peroxide; and the cross-linking treatment may be done either before foaming treatment of resin pellets of polyolefine or after preparation of foamed resin pellets.

Furthermore, there may be used as a faoming agent in this invention in preparation of foamed resin pellets of polyolefine, any foaming agent which decomposes into gas by heating, or any gaseous compound, a vaporizable liquid compound, or any compound which easily gasifies at an ordinary temperature (such as room temperature) or any combination thereof.

Although there appears to have been no study of the nature of the cells, it appears to have been taken for granted by workers in the art that most of the cells or pores contained in foamed resin pellets of polyolefines thus obtained were of closed cell structure. The inventors have discovered that this is not the fact. Surprisingly, the inventors have discovered, that there was no product on the market which had a ratio of 65% or more of closed cell volume to total volume of total cells. The percentage was measured by use of a pyeometer of the type employing comparison of air volumes, as will be discussed hereinfafter in greater detail. Some typical resuls observed by the inventors are shown in Table 1.

used of the thermally decomposition type which has a low decomposition temperature, being as low as possible to mix same with the resin without thermal decomposition.

Practical examples for production of foamed pellets of synthetic resin of polyolefine which have more than 65% of closed cells, measured by a pyeometer of the comparison with air type, and are useful in the present invention, were already disclosed in U.S. Pat. application Ser. No. 237,967 filed Mar. 1972 assigned to the

TABLE 1

| Kind of synthetic resin | Cross-linking method | Gel content (%) | Foaming Agent | Method of production | Closed cells.(measured by pyeometer of air volume comp.type (%) |
|---|---|---|---|---|---|
| Polyethylene (high pressure method) | None | 0 | Di-chloro-tetra-fluoro-ethane | extrusion method foam-method (Dow method) | 44.5 |
| Polyethylene (high pressure method) | ionizable radiation | 7.6 | isobutane | foaming and pelletizing by extrusion , foamed pellets cross-linked by irradiation (BASF method) | 37.3 |
| Polyethylene (high pressure method) | ionizable radiation | 30.8 | azo-di-carbonic acid amide | after cross-linked by irradiation of pellets containing foaming agent, foamed by heating (Toray Method) | 60.7 |

The inventors furthermore extensively studied production of foamed pellets having large numbers of closed cells and discovered that the best way to produce pellets having the largest amount of closed cells, was to first prepare foamable pellets from cross-linked polyolefine pellets, such as polyethylene, by impregnating a gas or a liquid substance which evaporates easily under ordinary conditions and then heating to foaming at a temperature corresponding to the melting temperature of the starting resin or a little higher. By this procedure, foamed pellets having 98 to 80% closed cells were readily obtained; the percentage being volume of closed cells to volume of total cells multiplied by 100.

In one method of production of resin foam using an extrusion method which involves feeding a synthetic resin of polyolefine and a foaming agent into an extruder and heating same, it is possible to produce foamed pellets which have more than 65% by volume of closed cells, depending upon the kind of resin used as the starting material and kinds and amounts of foaming and auxiliary additives used. These foamed pellets may be used in the present invention after cross-linking by irradiation with ionizable radiation, provided the operating temperature is controlled in the extrusion process to retain the molten viscosity of resin in a proper condition to obtain fine pores, such as by adhering to the basic principle that the higher the pressure in the die the better, and the lower the temperature the better; such temperature control being preferable.

Furthermore, foamed resin of polyolefine may be produced by thermal treatment of foamable pellets containing a foaming agent, which is capable of decomposing thermally. The foamable pellets may be prepared prepared by an extrusion method by feeding the resin and the foaming agent into an extruder and extruding same under mixing at a temperature lower than the decomposition temperature of the foaming agent. The polyolefine may then be cross-linked by irradiation with ionizable radiation. The pellets are expanded by heating. It is possible to produce foamed resin pellets with more than 65% closed cells. A foaming agent is assignee hereof and now abandoned. By employing such procedure, products of more than 80% of closed cell content may be obtained. The present invention, employes through a process to be discussed hereinafter in greater detail, inorganic gas within the cells to obtain certain advantages.

Although the degree of magnification or enlargement of foamed pellets, the ratio of apparent volume of pellets to the volume of solid resin, may be adjusted to the degree of magnification or enlargement desired of the final product, those pellets whose magnification or enlargement is smaller than 40, are easy to produce. Of course, the invention is not limited to such enlargement.

Furthermore, diameters of independent or closed cells in foamed pellets in the invention may be 700$\mu$ to 20$\mu$, generally, and 500$\mu$ to 50$\mu$, preferably. In case the diameters are larger than 700$\mu$ the final moulded product has a tendency to lack flexibility and in case the diameters are small than 20$\mu$, there is a tendency to deform in a cooling state, as the inner pressure of the cells is reduced by cooling and cells themselves deform somewhat.

The foamed pellets obtained as mentioned above have only a small amount of residual foaming agent and may be used directly for moulding or preferably to reduce the agent in a proper manner, before use.

Retaining these porous pellets in an inorganic gas under a certain pressure, it is possible to contain the inorganic gas in the foamed pellets at a pressure of more than 1.18 atmospheres, upon moulding and foaming in a mould. The value of pressure given in these foamed pellets may be calculated from observed data of the inorganic gas volume, with elapsed time, generated from the pellets which were rapidly enclosed in another vessel transferred from a vessel where the pellets had been exposed to the inorganic gas under pressure.

The thus obtained foamed porous pellets containing an inorganic gas under pressure is then placed in a mould until filled, and heated to foam (i.e., expand) within the mould and to adhere to each other tightly to accurately and precisely fit the shape of the mould and the final product is thus obtained. When heated the pellets expand, push one another during the expansion, and firmly and tightly adhere to each other. The expansion is to the limit of the mould. No substantial distortion is produced, in the moulded shape.

An important feature of the invention, and which feature enable the advantageous precise moulding to shape of the pellets, is the containment of the inorganic gas under pressure of 1.18 atmospheres or more in the cells of the foamable pellets. It is thus preferable to use such pellets containing such inorganic gas under pressure to fill substantially completely the mould. The mould also, preferably has an opening suitably positioned and sufficiently in capacity to enable gas to escape. The mould is thus tightly fitted, but not gas tight. A separate hole of course can be made in the mould for escape of gas.

The degree of magnification or enlargement (i.e., expansion) of the foamed moulded product, depending upuon its closed cell content, is inherently determined by apparent volume of preliminary foamed pellets filled in the mould. As apparent volume of foamed pellets taken out after exposure to inorganic gas, somewhat changes depending upon the time and temperature of exposure under pressure of inorganic gas, it is necessary to know before hand the relation between apparent volume and condition for exposure.

The inorganic gas used in the invention may have a critical temperaturer lower than that applied in the moulding process and therefore is not liquified at any operating pressure or temperature and exists always as a gas in the mould. This may give a different effect to the foaming process in a mould than in the case of foaming with a foaming agent. That is, in case of the latter, the foaming agent necessarily absorbs thermal energy to evaporate or to decompose itself to gas in the foaming and moulding process. This may induce one to select an operating temperature which is higher than the optimum temperature; an especially noticeable deficiency when a foaming agent is used in a large amount.

In the present invention, an inorganic gas may be used at a considerably higher temperature than its critiical temperature. Thus,, it becomes possible to operate a moulding process at a lower temperature than in the case of using any foaming agent.

Moreover, the method of moulding of the present invention has such advantages as good adhesion among the pellets, flow of polyolefine resin by heating at the surface of the mould being smooth, and thus the article has a smooth surace. Furthermore, advantageously, in this invention only a small amount of water remains in the inside of the moulded product if steam is used as a heating means.

It may be pointed out that generally inorganic gas may rapidly escape from the pellets. Thus, it is desirable to heat up quickly the pellets in the moulding process. But, advantageously, in this invention, pellets exposed to ambient air for about 30 to 60 minutes after treatment with inorganic gas to contain same in the pellets at a pressure higher than 1.18 atmospheres pressure may still be used in the moulding process.

The foamed, expanded moulded product produced by the above procedure is then cooled in the mould. The cooling may be performed by natural or forced cooling with air or water cooling. The moulded product may be removed from the mould after cooling or preferably while its temperature is between the melting point of the starting resin and 50°C below the melting point; or most preferably while its temperature is between the melting point and 30°C below the melting point.

If the moulded product is taken out at too high a temperature (for example, at a temperature higher than its melting point) the surface of the product becomes rough by after-foaming.

On the other hand, if the moulded product is cooled down in the mould so its temperature is more than 50°C below the melting point of the basic or starting resin (i.e., the temperature is lower than the 50°C below melting point), the degree of reduced pressure or vacuum in the cells in the moulded product becomes so large so as to deform the wall structure and sometimes, also, the moulded product will deform partially, such as making a hollow portion by shrinkage, thus deviating from the desired figure or shape. This phenomenon occurs in cases of high degree of expansion of foamed molded articles.

Considering the above extreme cases, it is clear why it is desirable to choose an optimum range of temperature of cooling when removing the moulded product from the mould. Although the inner pressure of the closed cells in the moulded product, removed from the mould at a temperature range between its melting point and 50°C below the melting point, or more preferably between melting point and 30°C below melting point, is in a reduced pressure or vacuum state, the moulded product itself has an accurate, precise shape which is substantially that of the mould, and has a smooth surface. Moreover, the outside ambient air rapidly enters into those cells, surprisingly, without producing any deformation of the moulded product. Thus, the inventors have succeeded in producing a foamed, moulded product which accurately and precisely fits any desired shape or figure without any deformation and with dimensional stability and by using a lower temperature moulding and with a shorter work cycle.

As a synthetic resin of polyolefine used in the present invention, those available are, for example, polyethylene obtained by a high pressure method; polyethylene obtained by a medium or low pressure method; polypropylene and copolymer of ethylene with other olefines, such as propylene or with vinyl compounds, such as vinyl acetate, independently or as a mixture of two or more; or moreover a mixture of not less than 50% of polyolefine series resin with not more than 50% of thermoplastic resins or synthetic rubbers which are capable of being blended therewith. Thus, the term "polyolefine" as used herein shall cover the foregoing.

As figures or shapes of foamed resin pellets of polyolefines, any geometrical shape may be used, such as spherical, ellipsoidal, cylindrical, cubic and orthogonal; with lengths and diameters being 1 to 15 mm. But, the listed shapes, diameters and lengths are merely given for illustration and the invention is not limited thereto.

The observation of total volume of independent (or closed) cells contained in foamed pellets may be carried out with an pyeometer of the type employing comparison with excluded air. An example of such meters is that manufactured by Toshiba-Beckman Corporation, Type 930, "Comparison with air type", pyeometer.

That is, a real or practical volume occupied by a sample of foamed product is measured by the above Toshiba-Beckman pyeometer. The volume ratio of independent pores (or closed cells), to continuous pores (non-closed cells) is calculated from the observed value by a formula set forth by W. J. Remington and R. Pariser.

The principle of the observation is as follows: Assume a condition wherein a sample of foamed resin pellets is received in a closed system and the pressure of the system is abruptly changed. Space volumes which do not concern this abrupt change are those of two kinds of spaces occupied by solid resin itself and independent pores (closed cells) whose volume is to be determined, since those cells are covered closely with solid resin itself to prevent rapid escape of occluded (i.e. contained) air or rapid diffusion of outside air. It is relatively easy to follow the abrupt change in case of the continuous pores (or non-closed cells). As the volume of solid resin itself is easily determined by its specific volume, it is evident that the volume of independent or closed cells may be observed separately by the above mentioned principle. This is done in practice with the pyeometer of the comparison with air volume type. (Experimental method) The necessary data are as follows:

1. Geometrical volume of sample, determined by its dimensions.
2. Weight of sample.
3. Specific volume of sample polymer.
4. Volume of air replaced by sample, or excluded volume by solid resin itself and cells, $\Delta V$.

Among the above, the replaced volume $\Delta V$ in item (4) is observed by the pyeometer, such as manufactured by Toshida - Beckmann. In the present specification, results are shown observed by the so-called "1 - ½ - 1 atmosphere pressure method", described at page 6, of the instruction booklet accompanying the "Toshiba-Beckmann pyeometer, Type 930, Comparison with Air Volume Type".

From the observed data, volumes of independent (closed) cells, continuous (non-closed) cells and foamed resin i.e. cell walls (polymer part) can be determined and these values are defined in this specification as follows:

(1). Volume ratio occupied by independent (i.e. closed) cells (%) =

$$\frac{V - \frac{\text{Weight of sample (g)}}{\text{Specific gravity of polymer}}}{\text{Geometrical volume of sample (cc)}} \times 100.$$

(2). Volume ratio occupied by continuous (i.e. open) cells (%) =

$$\frac{\text{Geometrical volume of sample (cc)} - \Delta V}{\text{Geometrical volume of sample (cc)}} \times 100$$

(3). Volume ratio occupied by cell walls or polymer part (%) =

$$1 \div \frac{\text{Geometrical volume of sample (cc)} \times \text{Specific gravity of resin polymer}}{\text{Weight of sample (g)}} \times 100$$

The cross-linking treatment of synthetic resin of polyolefine is carried out by any known method.

There may be used as a foaming agent for preparing foamed pellets of polyolefine containing 0.01 to 70% gel, such known agents of thermally decomposition type and a gas or a liquid which readily evaporates under ordinary conditions.

An inorganic gas is used in the invention. Such inorganic gas may be so called permanent gases, such as air, nitrogen, helium, neon and argon, etc; and other gases, such as occasionally carbon dioxide, methane and ethane etc. Among them, air is most preferable.

These inorganic gases may be used independently or as a mixture of two or more kinds and the choice of gas to be used and its applying conditions depend upon the kinds of starting resin and the properties of the foamed pellets, especially on such properties as degree of enlargement by foaming, dimensions of pellets, ratio of closed cells of total cell- and diameters of cells, etc. For example, in case of foamed pellets of 1.8 mm in diameter of high pressure method polyethylene containing 50% gel, and having such porosities as magnification or enlargement (i.e. expansion) degree of resin is 25 and volume ratio of closed cells to total cells is 85%, it is preferable to use air at a pressure higher than 20 kg/cm$^2$ for a period longer than 20 minutes and at a temperature lower than but close to the melting point of the starting resin. The closer to the melting point the better. As an example, a temperature higher than 90°C is preferable in the case of polyethylene.

The foamed pellets of synthetic resin of polyolefine which have 0.01 to 70% gel constant and more than 65% of the cells, by volume, are closed cells, may be placed in an atmosphere or ambient of inorganic gas. It is suitable to place them in a pressure proof vessel and then introduce inorganic gas into the vessel and keep the vessel at a desired pressure and temperature for a suitable length of time. Moreover, the operation may be repeated.

Although the pellets containing a residue of foaming agent which was used for preliminary foaming are available, it is desirable not to keep such substance in the pellets.

The inner pressure of the cells should be more than 1.18 atmospheres, or more preferably more than 1.4 atmospheres, until just before the moulding process, as above mentioned. Foamed pellets having inorganic gas occluded (i.e. contained) in their cells by the treatment above mentioned, are filled into a mould. Immediately or during the moulding process, the gas pressure is kept at a pressure higher than 1.18 atmospheres of pressure. The mould is of a configuration such that it is able to enclose tightly the resin pellets placed therein, but the mould should not be gas and thus should be able to allow gas to leak or escape therefrom. Moulding carried out with such mould and the above discussed pellets containing inorganic gas at a pressure of more than 1.18 atmospheres therein, will produce a final article of good quality and of a shape precisely and accurately fitting the mould, which shape can be as complex as desired.

As a method for filling up the mould with the foamed pellets, such techniques may be applied as, an ordinary pressure method using a compressed air for feeding; a method of feeding by the application of pressure differences generated by the evacuation of the mould and a method combining compressed air feeding and pressure differences generated by the evacuation of the mould, etc.

Heating of a mould, filled with the foamed pellets, may be carried out under ordinary pressure, elevated pressure or reduced pressure; using hot air or steam heated to 100° to 300°C; infrared rays and high frequency magnetic fields, or by contact with a liquid heating medium which does not erode foamed substances. Among these, heating by steam is preferable.

As a method of cooling after heating, natural cooling with air, forced cooling with gas, such as air, and water cooling are available. Water cooling is preferable.

Figure 1:
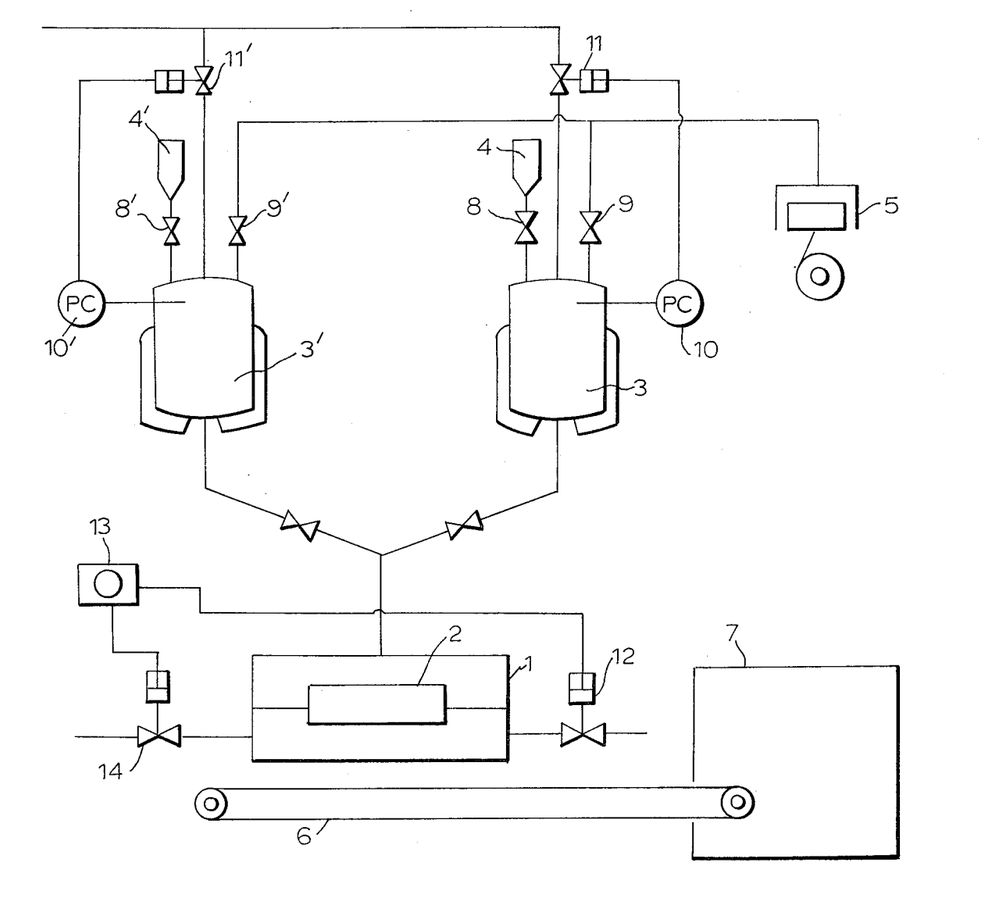
The single FIGURE depicts an apparatus for the practice of the invention.

The apparatus to be used in performing the present invention is further described hereinbelow taken together with the drawing, which single figure thereof depicts one example of the apparatus usable in the invention.

As shown in the single figure, the apparatus comprises a moulding machine 1 having closed mold 2; impregnating vessels 3 and 3' used for impregnating the polyolefine pellets; hopper 4 and 4' connected via valves 8 and 8' and associated pipes to vessels 3 and 3' for feeding the preliminary foamed pellets; means and pipes 5 for feeding inorganic gas, such as air, etc., via valve 9 and 9' and associated pipes to vessels 3 and 3'; pressure regulator 10 and 10' and associated pipes and valves 11 and 11' for purging gas and material from vessels 3 and 3'; heating and cooling time regulators 13, which operates through valves 12 and 41 to regulate the temperature of the moulding machine 1; and transporting apparatus, such as a conveying system, 6 for carrying the moulded product or article from the moulding machine 1 to the aging room 7.

The operation of the system is simple: already foamed pellets are supplied through hoppers 4, 4'', valve 8, 8' to impregnator 3, 3', either to one or both as the circumstance demands, as explained also hereinbelow, and concurrently therewith suitable amounts of inorganic gas, such as air is supplied by means 5 thourhg valves 8, 9'. The impregnated are then fed through suitable pipes to the mould 2 to fill up same. Thereafter, heat is supplied by means 13 to cause expansion of the pellets. Thereafter, the moulded articles are conveyed via belt 6 to aging room 7. The times, temperatures, pressures, etc and other operating conditions are set forth and discussed elsewhere and are applicable with this apparatus.

The figure shows an instance where each impregnating vessel 3 or 3' can receive preliminary foamed pellets in the same amount as is receivable in the mould 2 to fill it up at one time. Almost the total amount of the preliminary foamed pellets, after being impregnated with the inorganic gas may thus be introduced into the moulding machine. Therefore, the apparatus shown in the figure may be conveniently used when the moulding machine 1 and the impregnating vessel 3 or 3' are not fully operated, even though the work cycle of the impregnating vessel 3 or 3', is twice or more longer than that of the moulding machine 1.

As it is often desired to have an impregnation cycle longer than 15 minutes, and the work cycle of the moulding process in the moulding machine 1, in case of preliminary foamed pellets of synthetic resin of polyolefine, is 2 to 5 minutes; in order to operate the moulding machine 1 and the impregnating vessel 3 or 3' to full capacity, it becomes necessary to produce moulding materials in three to more than 10 separate impregnating vessels in order to supply one moulding machine, thus resulting in high costs of equipment, complexity of operation and high cost of operation.

Thus, for full scale operation, it is better to use two large impregnating vessels 3 and 3' to impregnate the pellets with inorganic gas, such as air, said vessels having capacity of several to scores times the amounts to be used to fill the moulding machine 1. Pellets in an amount equal to that to be filled into the moulding machine at one time may be first impregnated, then removed to and weighed in a weighing vessel, (not shown, but may be placed between the vessel and machine), then transferred to a purging vessel (not shown, but may be placed between the vessel and machine) to adjust the inner pressure of the cells to a desired degree more than 1 atmospheric pressure, purging the inorganic gas and material from the vessel, then filling the pellets into the moulds with the residual inorganic gas contained in the cells. With suitable equipment, such operation can also take place in the impregnating vessel. While such procedure is being repeated continually, the next impregnation may be carried out in another impregnating vessel. The invention will now be further illustrated with actual examples, which are not to be construed to limit the invention.

EXAMPLE 1

Polyethylene pellets containing 48.5% of gel obtained by a cross-linking treatment of polyethylene pellets produced by a high pressure method, (Available as Miran-9, from Mitsui Polychemical Corp.) were received in a pressure-proof vessel and impregnated with di-chloro-di-fluoro-methane at 60°C for 2 hours under pressure. The pellets containing 13.5 weight % of di-chloro-di-fluoro-methane were heated by steam at 1.2 kg/cm$^2$ pressure for 20 sec. and preliminary foamed pellets were obtained, whose closed cell content to total cells was 86% and apparent volume was 17.9 cc/g.

The thus obtained preliminary foamed pellets were supplied to and contained in a pressure-proof vessel under a pressure of 18 kg/cm$^2$ of air at 95°C for 20 minutes continuously and then the pressure was reduced to an ordinary one (atmospheric pressure). Thus, expanded, foamed pellets, which had contained air in the cells at 1.9 atmospheres pressure and 27.3 cc/g of apparent volume, were obtained without any shrinkage. These pellets were filled immediately into a closed mould of 580 mm × 355 mm × 50 mm of inner dimensions, with a fine hole for escape or exhaust of gas and heated by steam to mould them. Then the resulting product was taken out from the mould after cooling with water for 50 sec. The obtained, expanded, moulded products, prepared by steam heatings of different conditions in moulding were observed for their various qualities as shown in Table 2. Another example is shown therein as a reference (Sample No. 6), in which preliminary foamed pellets were not treated with a compressed air to contain it in them and the quality of the obtained final product was very ppor as seen in the table.

Table 2

| Sample No. | Apparent volume of preliminary foamed pellets (cc/g) | Pressurized air treatment C° × kg/cm$^2$ × min. | Apparent volume of foamed pellets treated with the air (cc/g) | Pressure of steam in moulding (kg/cm$^2$) | Surface condition | Quality of the foamed product | | |
|---|---|---|---|---|---|---|---|---|
| | | | | | | Adhesion among pellets in the inside | Appearance | |
| 1 | 17.9 | 90 × 18 × 20 | 27.4 | 1.9 | good | o | no deformation | |
| 2 | '' | '' | 27.2 | 1.5 | '' | o | no deformation | |
| 3 | '' | '' | 27.6 | 1.2 | '' | o | no deformation | |
| 4 | '' | '' | 27.2 | 1.0 | '' | o | no deformation | |

Table 2-continued

| Sample No. | Apparent volume of preliminary foamed pellets (cc/g) | Pressurized air treatment C° × kg/cm² × min. | Apparent volume of foamed pellets treated with the air (cc/g) | Pressure of steam in moulding (kg/cm²) | Surface condition | Quality of the foamed product Adhesion among pellets in the inside | Appearance |
|---|---|---|---|---|---|---|---|
| 5 | '' | '' | 27.5 | 0.8 | '' | o | no deformation |
| 6 | '' | none | 17.9 | 1.5 | very bad (granular) | x | large shrinkage and deformation |

Remarks
1. Adhesion among pellets in the inside
   o : More than 80% is adhered.
   x : Less than 10% is adhered.
   Δ : More than 50% is adhered.
2. Steam heating was continued until a proper heat quantity was given at every given pressure shown in the table.

EXAMPLE 2

Polyethylene pellets, containing 55.3% of gel, obtained by a cross-linking treatment of a polyethylene produced by a high pressure method (using a commercial product of other grade than that used in Example 1) were impregnated with di-chloro-di-fluoro-methane as in Example 1 and heated by steam at 0.7 kg/cm² of pressure for 20 sec. The obtained foamed pellets without any shrinkage had 92% of closed cell content to total cells and 20 cc/g of apparent volume. The foamed pellets were exposed to a hot air of 45°C for 48 hours, to expel the residual foaming agent completely.

One part of the treated pellets was received in a pressure-proof vessel and retained in an atmospheric of di-chloro-di-fluoro-methane at 65°C, under a pressure of 13 kg/cm². The sample, contained 34 weight % of the above mentioned freon gas, and was filled in a closed metallic mould as in Example 1 and heated to expand and to push one another and form in the mould, by a steam of 1.2 kg/cm². The sample was then taken out from the mould, after cooling with water for 50 sec. To expel the foaming agent, another part of the treated pellets was received in a pressure-proof vessel and retained in an atmosphere of air at 98°C for 20 minutes under a pressure of 20 kg/cm², as in Example 1 and then the pressure was reduced to an ordinary one (atmospheric pressure). The sample was taken out from the vessel and immediately filled in a closed metallic mould and moulded by heating with steam in the same condition as the above mentioned. Thus two samples of moulded product were obtained and their qualities were compared as shown in Table 3. Both of them had a good appearance without any shrinkage, however, on the standpoint of adhesive condition in the inside and water content, it was clear that the latter, which had been treated in an atmosphere of high pressure air, was better than the former.

Table 3

| Kind of gas, used for foaming in moulding process | Apparent volume of foamed pellets, after impregnated with foaming agent under pressure (cc/g) | Quality of the foamed product | | | |
|---|---|---|---|---|---|
| | | Specific volume (cc/g) | Water content (weight %) | Adhesive condition in the inside (%) | Appearance |
| Di-chloro-di-fluoro-methane | 28.2 | 23.2 | 8.9 | 50 | no deformation |
| Air | 24.0 | 23.0 | 5.9 | 90 | no deformation |

EXAMPLE 3

Using a sample of polyethylene pellets, containing 46.3% of gel prepared from a polyethylene by a high pressure method, preliminary foamed pellets, having 86% of closed cell content to total cells and 20.2 cc/g of apparent volume, were obtained. The pellets were then retained in a pressure-proof vessel under a pressure of 18 kg/cm² in an atmosphere of mixture of nitrogen and air at 93°C for 10 minutes. Then the pressure was reduced to an ordinary one (atmospheric pressure). Immediately thereafter, the pellets were placed in to fill the same metallic mould as used in Example 1 and moulded by steam heating at 1.2 kg/cm². The effect of the temperature of removal of the moulded product from the mould on the appearance and shrinkage of the expanded, moulded product was examined. The moulded products were taken out at inner temperatures of 92, 75 and 55°C, and results are shown in Table 4. It was confirmed that the shrinkage and deformation of the final foamed, moulded product are small when it was taken out from the mould at temperatures closest to, although below, the melting point of the basic material of polymer.

Table 4

| Inner temperature of product, taken out from a mould after moulding (°C) | Quality of moulded product | | | |
|---|---|---|---|---|
| | Apparent volume (cc/g) | Water content (%) | Shrinkage in the middle part (%) | Appearance |
| 92 | 25.7 | 6.9 | 0 | good |
| 75 | 25.5 | 7.9 | 0 | good |
| 55 | 23.9 | 9.5 | 0 | no good |

EXAMPLE 4

Various kinds of preliminary foamed pellets with different porosities of independent (or closed) cells, i.e., different ratios of closed cells to total cells, were exposed to a compressed air of 18 kg/cm² at 95° C for 20 minutes in a pressure-proof vessel as in Example 1 and then the pressure was reduced to normal. Immediately thereafter, each sample was filled up in a metallic mould, 300 mm × 180 mm × 120 mm of outer dimensions and 260 mm × 140 mm × 100 mm of inner dimensions, and moulded by steam heating at 1.5 kg/cm². The products were removed from the moulds after cooling with water for 15 sec. and examined for appearance, shrinkage and deformation. The results are shown in Table 5.

Table 6

| No. | Condition of impregnating of nitrogen | | | | Deformation of the obtained product |
|---|---|---|---|---|---|
| | Temperature (C°) | Pressure (kg/cm²) | Time (min) | Pressure of inorganic gas occluded in the foamed pellets* | |
| 1 | 25 | 18 | 20 | 1.67 | none |
| 2 | 25 | 18 | 10 | 1.62 | small |
| 3 | 25 | 18 | 5 | 1.60 | '' |
| 4 | 25 | 0 | 0 | 1.00 | large, bad appearance |
| 5 | 65 | 10 | 20 | 1.57 | small |
| 6 | 90 | 18 | 20 | 1.90 | none |
| 7 | 90 | 18 | 10 | 1.84 | none |

*to be used for moulding (atm)

Sample No. 4 was so bad as to be unusable for any application. Samples, Nos. 2, 3, and 4 were deformed in a small degree. Samples, Nos. 5, 6, and 7 had no tendency to deform and were of good quality.

EXAMPLE 6

Two kinds of foamed pellets, which are different in their diameters of cells as shown in Table 7–1, were treated as in previous examples. That is, each of them was exposed to air or nitrogen separately under a pressure of 20 kg/cm² for 20 minutes at 95°C in a pressure-proof vessel and then the pressure reduced to normal. Each one of four samples thus obtained was immediately filled in a closed metallic mould having a fine hole (580 mm × 355 mm × 50 mm of inner dimensions) and moulded by steam heating at 1.2 kg/cm² pressure. The moulded products were taken out from the moulds after cooling with water for 50 sec. and tested. The results are shown in Table 7–2. The term "porosity of independent cells" is the same as percent volume of closed cells to volume of total cells.

Table 5

| No. | Independent porosity (closed cells to total cells) (%) | Apparent density of preliminary foamed pellets (cc/g) | Quality of moulded product | |
|---|---|---|---|---|
| | | | Apparent volume (cc/g) | Deformation, appearance |
| 1 | 35 | 21.0 | — | impossible to mould |
| 2 | 47 | 27.0 | — | '' |
| 3 | 60 | 26.5 | — | large shrinkage, no good |
| 4 | 86 | 27.2 | 26.5 | good |
| 5 | 95 | 27.5 | 27.0 | good |

Remark: Samples No. 1 and No. 2 were impossible to mould, that is, the pellets did not adhere to each other and shrunk separately.

EXAMPLE 5

Polyethylene pellets containing 48.5% of gel, prepared from ordinary polyethylene pellets commercially available on the market, were preliminary foamed to have 87% of closed cell content and 32 cc/g of apparent volume. After the pellets were impregnated with nitrogen in a pressure-proof vessel at various pressures and temperatures for various minutes, each of those samples impregnated at various conditions was filled automatically by a method involving pressure difference, into a closed metallic mould with a fine hole (580 mm × 355 mm × 50 mm of inner dimensions) and moulded by a steam heating at 1.2 kg/cm² pressure. Then the products were taken out after cooling for 60 sec. with water. The results are shown in Table 6.

Table 7-1

| Raw material No. | Diameter of cell (μ) | Content of gel (%) | Porosity of independent cells (%) | Apparent volume (cc/g) |
|---|---|---|---|---|
| 1 | 50 | 55 | 82 | 20 |
| 2 | 200 | 48 | 87 | 24 |

Table 7-2

| No. | Gas | Raw material No. | Quality of moulded product | | |
|---|---|---|---|---|---|
| | | | Apparent volume (cc/g) | Water content (weight %) | Deformation |
| 1 | air | 1 | 23.0 | 5.9 | None |
| 2 | nitrogen | 1 | 23.5 | 5.5 | '' |
| 3 | air | 2 | 26.6 | 6.6 | None |

Table 7-2-continued

| No. | Gas | Raw material No. | Quality of moulded product | | |
|---|---|---|---|---|---|
| | | | Apparent volume (cc/g) | Water content (weight %) | Deformation |
| 4 | nitrogen | 2 | 26.1 | 6.9 | '' |

As shown in Table 7–2, these products are superior.

REFERENCE EXAMPLE 1

The same preliminary foamed pellets used in Example 1 were received in a pressure-proof vessel and exposed to di-chloro-di-fluoro-methane at 70°C under a pressure of 14.5 kg/cm² and impregnated, in an amount of 38 weight %. The treated pellets were immediately filled in a closed metallic mould having a fine hole and having inner dimensions of 580 mm × 355 mm × 50 mm and moulded by heating at various conditions of steams. The products were taken out after cooling with water for 65 sec. and tested. The results are shown in Table 8.

Table 8

| Sample No. | Pressure used in moulding (kg/cm²) | Quality of the obtained foamed product | | |
|---|---|---|---|---|
| | | Surface Appearance | Adhesion in the inside | Appearance |
| 1 | 1.9 | good | o | no deformation |
| 2 | 1.5 | '' | o | '' |
| 3 | 1.2 | clearances among pellets | Δ | small deformation |
| 4 | 1.0 | large clearances among pellets | x | large deformation |
| 5 | 0.8 | no adhesion bad | x | large shrinkage, large deformation |

Note: See Note following Table 2 for definitions.

As shown in Table 8, in order to obtain a product of good quality, it is necessary to use a steam pressure higher than 1.5 kg/cm² and it is clear that compared with Example 1 of the present invention in which a compressed air is used for foaming, the work temperature is rather high and, moreover, the work condition itself is limited to a short range.

EXAMPLE 7

Polyethylene pellets containing 0.7% of gel, prepared from cross-linking of high pressure method polyethylene of 0.3 of melt index, were received in a pressure-proof vessel and exposed to an atmosphere of di-chloro-di-fluoro-methane at 70°C for 2 hours. The methane impregnated the pellets in an amount of 22 weight %.

The treated pellets were heated with a steam of 0.8 kg/cm² for 20 sec to cause foaming. The preliminary foamed pellets had 21.8 cc/gr of apparent volume and 90% of closed cell content.

The obtained preliminary foamed pellets were received in a pressure-proof vessel and retained at 95°C for 30 minutes under an air pressure of 18 kg/cm². The thus treated pellets were filled immediately into a closed metallic mould (used for producing camera packing) having a fine hole and moulded at various heating conditions using steam. Each product was taken out from the mould after cooling with water for 15 sec. and tested. The results are shown in Table 9.

Table 9

| Sample No. | Apparent volume of preliminary foamed pellets (cc/g) | Steam pressure applied in moulding (kg/cm²) | Quality of the moulded product | | |
|---|---|---|---|---|---|
| | | | Surface Appearance | Adhesion in the inside | Appearance |
| 1 | 29.6 | 1.5 | good | o | good |
| 2 | '' | 1.4 | '' | o | '' |
| 3 | '' | 1.3 | '' | o | '' |

Note: See Note following Table 2 for definitions.

EXAMPLE 8

Preliminary foamed pellets of high pressure method polyethylene, having 95% of closed cell content and 20 cc/g of apparent volume, were prepared by foaming polyethylene pellets with 46% of gel content obtained by a cross-linking treatment of ordinary polyethylene pellets available on the market, with di-chloro-di-fluoro-methane. The pellets were exposed to an atmosphere of carbon dioxide at a high pressure in a pressure-proof vessel and then the pressure was reduced to normal. Immediately thereafter, the pellets were filled in a closed metallic mould of such dimensions as 580 mm × 355 mm × 50 mm, having a fine hole and moulded by steam heating at 1.2 kg/cm² pressure. The moulded product was taken out from the mould after cooling with water for 50 sec. The obtained final product had a good appearance and was without any deformation.

EXAMPLE 9

The preliminary foamed pellets obtained in Example 1, having 86% of closed cell content and 17.9 cc/g of apparent volume, were received in a pressure-proof vessel and exposed to an atmospheric air at a pressure of 18 kg/cm² at 90°C for 10 minutes. Then the pressure was reduced to an ordinary one, and again the treatment was repeated. That is, the pellets in the vessel were again exposed to a high pressure of air at 18 kg/cm² for 10 minutes.

The pellets, twice exposed to high pressure air for a total of 20 minutes were filled in a closed metallic mould having a fine hole which is the same one as used in Example 1 and moulded by steam heatings of two different conditions, 1.2 kg/cm² and 0.8 kg/cm² of steam pressure. Each product was taken out from the mould after cooling with water and its quality was evaluated as shown in Table 10.

Table 10

| Sample No. | Apparent volume of foamed pellets after an exposure to a compressed gas (cc/g) | Pressure of steam in moulding (kg/cm²) | Quality of foamed product | | |
|---|---|---|---|---|---|
| | | | Adhesion in the inside | Surface appearance | Appearance |
| 1 | 28.3 | 1.2 | o | good | no deformation |
| 2 | 28.3 | 0.8 | o | '' | '' |

Note: See Note following Table 2 for definitions.

From the above results, it was confirmed that, the effect of exposure of pellets to a high pressure inorganic gas is almost the same, regardless of a difference in the exposure process to perform it in one step continuously as in Example 1 or intermittently in two steps as in Example 9, if the total time of exposure is equal.

EXAMPLE 10

Using cross-linked polyethylene pellets, containing 48.3% of gell prepared from polyethylene foamed pellets, 88% of closed cells to total cells and 17.3 cc/g of apparent volume, were obtained and retained in a pressure-proof vessel under a pressure of 18 kg/cm² in a compressed air at a room temperature for 20 minutes, and then the pressure was reduced to an ordinary one. Immediately, 40 or 80 minutes after the reducing pressure, the pellets were filled in the same metallic mould as used in Example 1 and moulded by steam heating at 1.5 kg/cm². Then the product was taken out from the mould after cooling with water for 60 sec. The results are shown in Table 11 Samples 2, 3, and 4. The same experiment as above but without exposing to a compressed air was carried out in order to compare with the results of above experiments. The results are shown in Table 11, Sample 1.

Table 11

| No. | Time from after reducing pressure until moulding (min.) | Inner pressures of pellets in moulding (atm) | Apparent volume of the product (cc/g) | Adhesion index of the product |
|---|---|---|---|---|
| 1 | — | 1.0 | 19.9 | 4.5 |
| 2 | 0 | 1.66 | 26.7 | 19.3 |
| 3 | 40 | 1.25 | 27.5 | 16.6 |
| 4 | 80 | 1.18 | 27.0 | 17.7 |

Remark: Adhesion index is a relative numerical expression of strain which is generated to breaking of the moulded article by repeated blending of it.

As shown in Table 11, adhesion-degree of the foamed pellets in the product was found to be remarkably improved by having air in the preliminary foamed pellets at a pressure higher than 1.18 atm, in spite of the fact that the apparent density of the product decreased.

The foregoing description is for purposes of illustrating the principles of the invention. Numerous variations and modifications thereof would be apparent to the worker skilled in the art. All such variations and modifications are to be considered to be within the spirit and scope of the invention.

What is claimed is:

1. A method of moulding foamed synthetic resin pellets of polyolefines, comprising the steps of
   A. preparing preliminarily foamed synthetic resin pellets of cross-linked polyolefines to more than 65 percent by volume of closed cells;
   B. heating the pellets to temperatures up to the melting points of the polyolefin resins and impregnating said pellets with a gas under pressure so that said inorganic gas is contained within said pellets at a pressure of more than 1.18 atmospheres pressure;
   C. placing said gas impregnated foamed pellets into a mould having capabilities of enclosing said pellets and allowing escape of gas therefrom; and
   D. heating said pellets to cause expansion of said gas to thereby expand said pellets and cause tight adherence to each other and thereby form articles in the shape of said mould.

2. The method of claim 1, wherein further comprising the step of removing the resulting moulded product from said mould while the inner temperature of the product is between its melting point and a temperature 50°C below said melting point.

3. The method of claim 1, wherein said mould is held at a reduced pressure or at a pressure lower than atmospheric pressure and said pellets are held at a pressure higher than atmospheric pressure.

4. The method of claim 1, wherein the synthetic resin pellets consist essentially of cross-linked polyolefines having 0.01 to 70% gel content.

5. The method of claim 2, wherein the removed product is stored in a room or vessel at a temperature of 30 to 70°C below its melting point.

6. The method of claim 1, wherein said gas is contained in said pellets at a pressure of more than 1.4 atmospheres pressure.

7. The method of claim 1, wherein said gas is formed in said cells by heating the pellets in the presence of compressed gas in a pressure proof vessel to contain said gas in said cells at a pressure higher than 1.18 atmospheres and then purging said gas from said vessel, and then transfering said pellets containing said inorganic gas to fill said mould.

8. The method of claim 4, wherein said cross-linked polymer is obtained by irradiation of ionizable radiation; and the foaming is by employing an agent which becomes gaseous by heating, and heating to a temperature corresponding to the melting point of said polyolefine.

9. The method of claim 1, wherein the diameters of the closed cells range from 700 to 200μ.

10. The method of claim 9, wherein the diameters are 500 to 50μ.

11. The method of claim 1, wherein the products are expanded up to 40 times the original size.

12. The method of claim 1, wherein said inorganic gas has a critical temperature lower than the temperature applied during the moulding process.

13. The method of claim 1, wherein said polyolefin is selected from the group consisting of polyethylene obtained by a high pressure method; polyethylene obtained by a medium or low pressure method; polypropylene and copolymer of ethylene with other olefines, or vinyl compound, independently or as a mixture of two or more, or a mixture of not less than 50% of polyolefin series resin with not more than 50% of thermoplastic resin or synthetic rubbers.

14. The method of claim 1, wherein the foamed resin pellets are spherical, ellipsoidal, cylindrical, cubical or orthogonal in shape and of 1 to 15 mm in length or diameter.

15. The method of claim 1, wherein said gas is selected from the group consisting air, nitrogen, helium, neon, argon, carbon dioxide, methane, and ethane and any combination thereof.

16. The method of claim 1, wherein said heating of said mold is carried out using steam heat at 100° to 300°C.

17. The method of claim 2, wherein said cooling is by using water.

18. Method of claim 1, wherein said gas is air, and applied at a pressure of 20 kg/cm$^2$ or more, for a period longer than 20 minutes, and at a temperature lower than but close to the melting point of said polyolefine.

* * * * *